April 7, 1964  E. R. WORKMAN  3,127,903
VALVE DRIVE SYSTEM
Filed Feb. 27, 1961  4 Sheets-Sheet 1
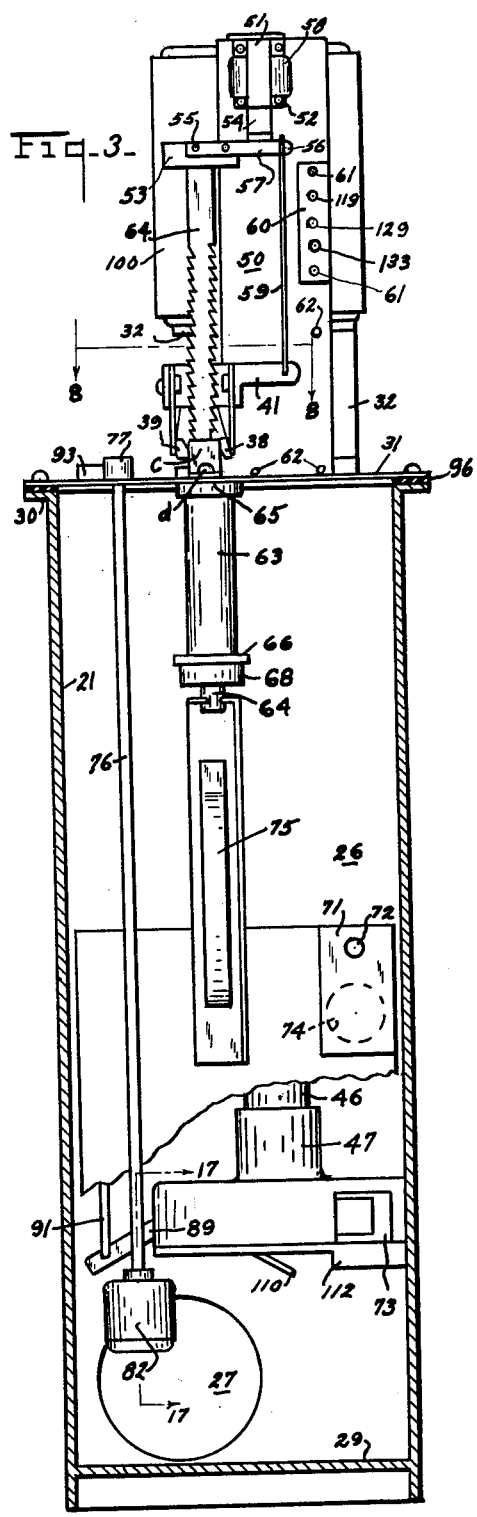
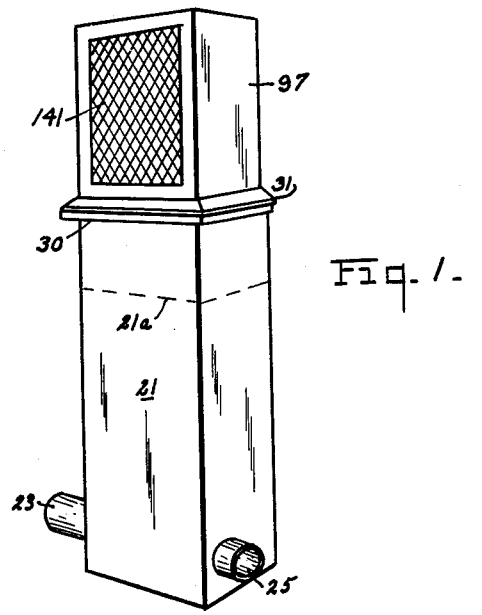
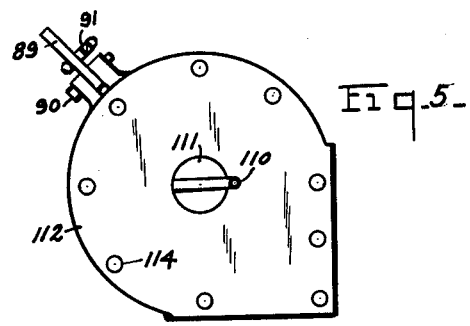
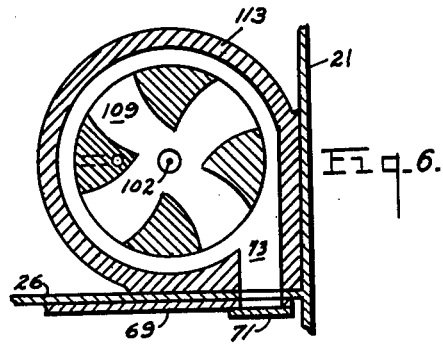
INVENTOR.
ERNEST R. WORKMAN.

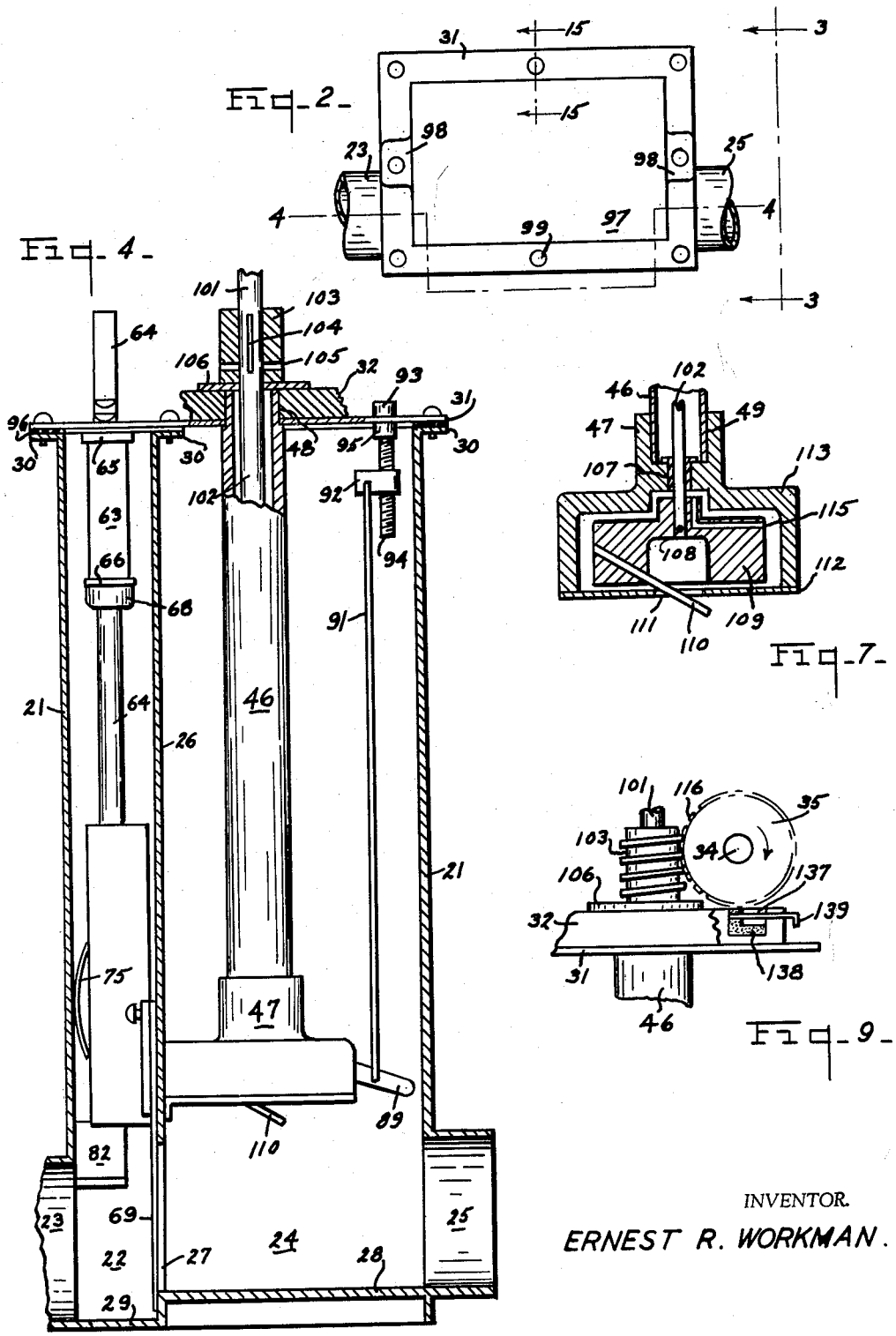

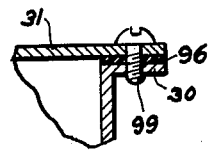
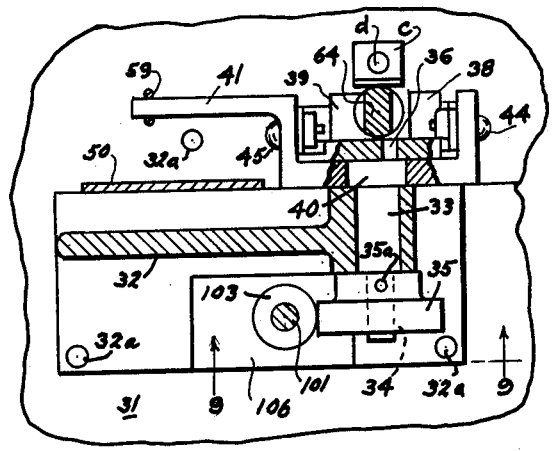
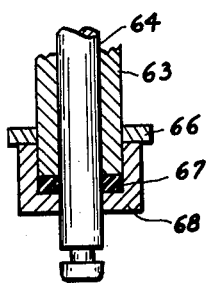
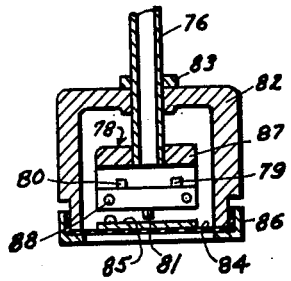
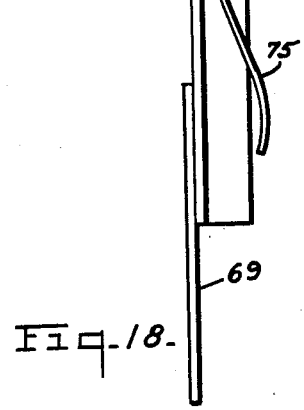
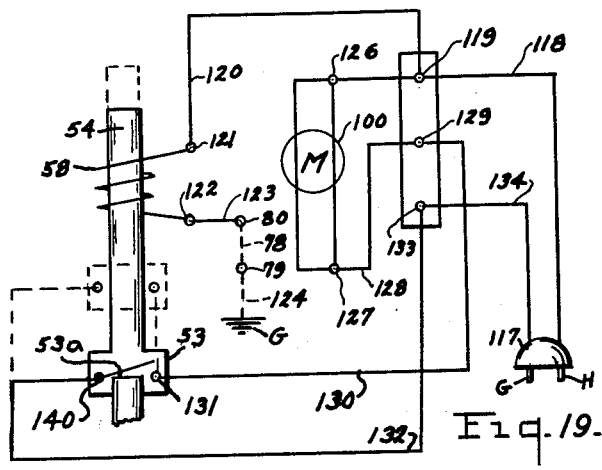
INVENTOR.
ERNEST R. WORKMAN.

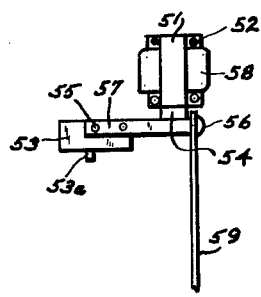
Fig-10-
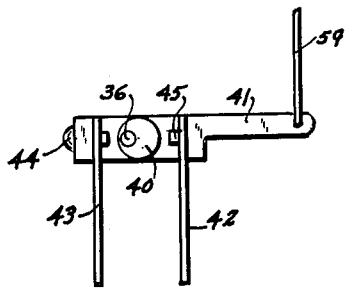
Fig-11-
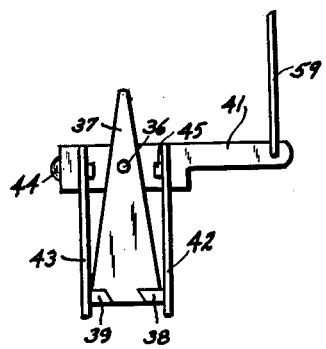
Fig-12-
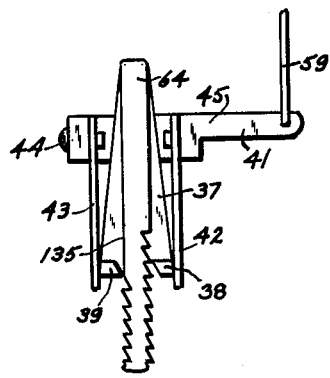
Fig-13-
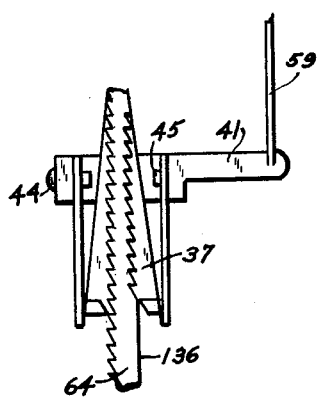
Fig-14-
INVENTOR.
ERNEST R. WORKMAN 3,127,903
VALVE DRIVE SYSTEM
Ernest R. Workman, Chicago, Ill., assignor to
James Ladas, Evanston, Ill.
Filed Feb. 27, 1961, Ser. No. 91,757
3 Claims. (Cl. 137—115)

This application is a continuation in part of my application, 669,160, filed July 1, 1957, now Patent Number 2,980,127, and relates to an improved valve drive system having mechanism and controls whereby a valve gate is closed and opened by pump mechanism as automatic steps in an operative cycle and wherein said automatic cycle is initiated and terminated as other steps of said cycle by electrical components of the system which are responsive to the rise, or fall, of a predetermined level of material in a drainage disposal system.

A principal object of the invention is the provision of pump mechanism whereby a valve gate mechanism may be actuated thereby, together with combined controls incorporated therewith, all arranged to provide a single unit that may be connected to close or open a drainage pipe for preventing the flooding of an area drained by said drainage pipe, which flooding may be due to a reverse flow of the drainage in said pipe from a drainage disposal system, and which reverse flow may be due to an excessive rise of the drainage in said drainage disposal system.

Another object of the invention is to provide a sump pump compartment in the unit for collecting drainage from a drained area during periods of such reverse flows of drainage material in a drainage pipe and to provide the pump with intake and discharge openings having connections between them through which the pump may force the collected drainage against any pressure that may then exist by reason of said excessive rise of the level of said drainage material in the drainage disposal system, to by-pass through said valve gate and into said drainage disposal system, when the valve gate is being maintained in closed position.

Other objects of the invention include the provision of: mechanism whereby the continuous rotary source of power for driving the pump is converted into reciprocating intermittent movements for closing and opening the valve gate as automatic steps in an operative cycle of the unit; a projection integral with a blade of the pump impeller and extending through the pump intake opening and rotating with said impeller, whereby solids in materials being pumped tending to enter said intake opening are engaged by said rotating projection and thereby disintegrated by the rotating projection and thus prevented from blocking the by-pass passageway through said pump; the extension of the pump discharge opening directly through the closed valve gate thereby eliminating the friction loss caused by the usual pump discharge pipes; a gravity closed flap mounted loosely on the valve gate to cover the pump discharge opening extended through the valve gate and arranged to be maintained in open position by drainage being discharged by the pump and also arranged to close said discharge opening through said pump upon reverse flow of a drainage through the pump by-pass passageway; an orifice or opening in the pump impeller whereby fluid being pumped is withdrawn from the pump impeller bearing and discharged by centrifugal force and thereby prevented from passing between said impeller shaft and its bearing and entering into the pump impeller shaft tube; a ratchet valve gate stem for actuating the movements of closing and opening said valve gate whereupon the teeth on said ratchet valve gate stem are arranged for limiting said actuated movements of the gate to its positive closed or positive open positions; resilient exerted friction against a valve gate and its stem whereby movements of the valve gate are limited to those movements actuated by the closing and opening mechanism of the gate; locking mechanism for securing a pump in operating position within a pump enclosure whereby the locking mechanism may be actuated from a point outside of the pump enclosure; a pump discharge opening continuing directly through a pump enclosure wall and thence directly through a valve gate thereby eliminating pump discharge pipes together with their back pressure and friction losses; a coupling between an electric motor shaft and a pump impeller shaft arranged with screw threads on its rim for meshing with teeth on a worm gear speed reduction mechanism for actuating a pawl and ratchet mechanism whereby the closing and opening movements of a valve gate may be actuated by power actuating a pump as automatic steps of an operative pumping cycle; a normally closed micro electric switch for controlling an electric motor circuit arranged to be maintained in open circuit relation between operative cycles of the unit by having its operating pin in forced contact with the top of a ratchet valve gate stem when the gate has been moved to positive open position and arranged to close said motor circuit when the armature of a solenoid, to which the micro switch is mounted, moves the operating pin of the switch from the top of the ratchet valve gate stem on energizing the coil of the solenoid, said armature also having a connection to a double acting pawl in engagement with opening teeth on said ratchet valve gate stem whereby said pawl is also brought into engagement with closing teeth on the opposie side of said valve gate stem upon said energizing of said solenoid coil; and a normally open micro switch adjustably mounted for response to a predetermined pressure of a diaphragm that in turn is responsive to a pressure exerted by a predetermined level of drainage material in a drainage disposal system for initiating and terminating operative cycles of the unit.

The foregoing objects and other objects of the unit are attained by the provision of two distinctive separate subunits arranged for assembly to each other.

The first sub-unit comprises a housing having: a valve gate chamber with an opening adapted for connection with a drainage pipe opening, a sump pump compartment with an opening adapted for connection with a drainage inlet pipe opening, a partition between the valve gate chamber and the sump pump compartment with an opening therethrough adapted to be closed by a valve gate and with a smaller opening therethrough adapted to extend a pump discharge opening through said partition, and a flanged rim around a top opening of the valve gate chamber and another flanged rim around the top opening of the sump pump compartment. The openings adapted to be connected with the inlet and outlet drainage pipe openings and the opening through the partition adapted to be closed by the valve gate is arranged to provide communication through the unit when the valve gate is open. The flanged rims around the top openings of the valve gate chamber and the sump pump compartment are adapted for securing an enclosure cover to both the chamber and the sump pump compartment by bolts or screws as hereinafter described.

The second sub-unit comprises the cover for enclosing the top openings of the valve gate chamber and the sump pump compartment of the first sub-unit and mechanism mounted to this cover include: an electric motor support in which a worm gear shaft is journaled and this shaft has, a stepped down diameter at one end on which a worm gear is secured by a shear pin, a stepped up diameter at its opposite end on the perimeter of which is journaled a lever carrying springs for exerting pressure on a double acting pawl and on the end of this stepped up diameter a crank pin projects for carrying a double acting pawl; a tube carrying a sump pump has its upper end press fitted into both said motor support and into said cover and a plate to which is mounted a solenoid having an armature to which is mounted a normally closed micro electrical switch and an electrical terminal block is also mounted to said electric motor support; a tube with a packing nut and packing and with locking nut at its lower end has its upper end screwed into this cover for providing a guide for a ratchet valve gate stem; another tube with a lock nut and a lock cap and carrying a normally open miniature micro switch and a diaphragm is also fitted into this cover and adapted for carrying an electrical conductor from the solenoid to the miniature micro switch and a sump pump lock lever connecting rod has its adjusting screw journaled through this cover so that the sump pump may be locked into its operating position in the sump pump compartment from a point outside of its enclosure.

The unit is constructed in two separate sub-units as above described so that the first sub-unit may be installed in a building drainage pipe line and secured in its installed position with concrete or a similar mixture and the second sub-unit thereafter assembled to the first sub-unit so as to be conveniently removable in the event that repairs or servicing may eventually be required by the mechanism or the electrical components incorporated into the second sub-unit.

A further important object of the invention is in the conversion, by speed reduction gearing and pawl and ratchet mechanism of rotary power motion into reciprocating power motion whereby intermittent movements of a valve gate are positively limited to their definitely closed or definitely opened positions by the limited number and limited position of teeth on a ratchet valve gate operating stem, as hereinafter will be further described.

Still another feature of the invention is the exertion of resilient friction against a ratchet stem of a valve gate for limiting the steps of closing and of opening movements of the valve gate in either directions to those movements actuated by the reciprocating pawl in its engagements with the teeth on the ratchet valve gate stem.

The use of pawl and ratchet mechanism actuated by pump mechanism during the pumping step of an automatic operative cycle for intermittently closing and opening a valve gate as automatic steps in the same automatic operative cycle and with ratchet teeth on the valve gate operating stem arranged in position and number for limiting said valve gate to definitely closed or definitely opened positions appears to be original with this application and has not heretofore been made use of.

To explain further features and objects of this invention, and to familiarize those skilled in the art with the manner of constructing and utilizing this invention in accordance with the principle involved, a description in connection with the accompanying drawing is given of a preferred embodiment of the invention.

In the drawing:

FIGURE 1 is an elevational view in perspective of a completely assembled unit embodying this invention, shown in reduced size;

FIGURE 2 is a top view of the unit shown in FIGURE 1;

FIGURE 3 is an elevational side view of the unit shown in FIGURES 1 and 2 in a direction indicated by 3—3 FIGURE 2, with a top cover for protecting an electric motor removed, the near side of a housing cut away to expose inner mechanism of the unit and a part of a valve gate and also a part of a partition between a valve gate chamber and a sump pump compartment cut away by the uneven line to expose a pump housing and its discharge opening, this figure also shows a normally closed electric micro switch held in open circuit relation by the top end of a valve gate ratchet stem;

FIGURE 4 is an elevational view of the unit shown in FIGURES 1 and 2 in a direction indicated by 4—4 in FIGURE 2, with a near side of a housing cut away to expose inner mechanism of the unit, a part in section to show a worm of a speed reduction gear mechanism as providing a coupling between an electric motor shaft and a pump impeller shaft and with a top cover for protecting an electric motor removed;

FIGURE 5 is a bottom view of a sump pump;

FIGURE 6 is a sectional view of a sump pump at a central line of the pump discharge opening;

FIGURE 7 is a vertical sectional view of a sump pump at a central line of a pump impeller shaft with the shaft and a disintegrator pin shown in full, and showing a disintegrator as being an integral part of a pump mechanism;

FIGURE 8 is a sectional plan view of an electric motor support on a central line of a worm gear shaft in a direction as indicated by 8—8 in FIGURE 3 with a top of a pawl spring lever and the tops of the pawl springs and the spring mounting screws shown in full;

FIGURE 9 is an elevational end view of a worm gear mechanism driven by a coupling between the shafts of an electric motor and a pump impeller in a direction indicated by 9—9 in FIGURE 8;

FIGURE 10 shows a relative position of a normally closed micro switch mounted to the armature of a solenoid when the coil of the solenoid is energized and showing the operating pin of the micro switch when the switch is in normally closed position;

FIGURE 11 shows a pawl spring mounting lever with the pawl springs mounted thereto as being mounted on the perimeter of an increased diameter portion of a worm gear shaft;

FIGURE 12 is similar to FIGURE 11 but shows a pawl being mounted on a crank pin of a worm gear shaft;

FIGURE 13 is similar to FIGURE 12 but shows a projection of a pawl mounted for reciprocating in idleness in contact with a smooth toothless portion of a valve gate ratchet stem, after the valve gate has been actuated by the projection to its definite closed position;

FIGURE 14 is similar to FIGURE 13 but shows another projection of the pawl shown in FIGURE 13 as being mounted for reciprocating in idleness against another smooth toothless portion of a valve gate ratchet stem after the gate has been actuated to definite open position by said pawl projection;

FIGURE 15 is a fragmentary sectional view of one of a series of screws for securing sub-units to each other, in a direction indicated by 15—15 in FIGURE 2;

FIGURE 16 is a sectional view of a packing nut and packing assembly as indicated by 16—16 in FIGURE 3;

FIGURE 17 is a sectional view of a diaphragm electrical switch assembly in a direction as indicated by 17—17 in FIGURE 3;

FIGURE 18 is a left side elevational view of a valve gate shown in FIGURE 3, and FIGURE 19 is a wiring diagram showing the connections for the electrical components of the unit.

In all of the foregoing figures with the exception of FIGURES 4 and 13 the unit is shown to be in a normally idle condition and being maintained in readiness for the initiation of an automatic operative cycle when drainage in a valve gate chamber rises above a predetermined level by a reverse flow from a drainage disposal system.

Referring now more in detail to the several figures of the drawing, 21 is a housing for a first sub-unit having: a valve gate chamber 22 with a connection 23 for an outlet drain pipe, a sump pump compartment 24 with a connection 25 for an inlet drain pipe, a partition 26 with an opening 27 adapted to be closed by a valve gate, a bottom 28 for closing a lower end of the sump pump compartment, a bottom 29 for closing a lower end of the valve gate chamber and flanges 30 adapted for securing a cover 31 for enclosing the top of both the valve gate chamber and the sump pump compartment.

The second sub-unit comprises the above cover 31 and this cover has mounted to it the entire mechanism of the unit and this mechanism includes: an electric motor support 32 secured to the cover 31 by bolts or screws 32a and journaled in this support 32 is a shaft 33 which has at one end a stepped down diameter 34 on which a worm gear 35 is secured by a pin 35a, at the opposite end of this shaft 33 is a stepped up diameter 40 from which extends lengthwise a crank pin 36 and on this crank pin 36 is pivoted a double acting pawl 37 which carries two projections 38 and 39 and this stepped up diameter 40 also has journaled on its perimeter a pawl spring lever 41 to which pawl springs 42 and 43 are mounted by bolts or screws 44 and 45; a tube 46 carries a sump pump 47 at its lower end and the upper end of this tube 46 is press fitted into both the cover 31 and the electric motor support 32, as shown at 48 in FIG. 4, and the lower end of this tube 46 is press fitted into the sump pump housing 47 as shown at 49 FIG. 7; said pump having a vertical cylindrical bore on the interior thereof with two exterior walls forming a right angle corner portion, see FIGURES 5 and 6, said corner walls fitting into a corner of said sump pump compartment 24, and in close contact with the corner walls of said compartment. A plate 50 to which is mounted a solenoid 51 by screws 52 has a normally closed micro switch 53 mounted to its armature 54 by rivets 55, a screw 56 and a bracket 57 and this solenoid has an energizing coil 58 and a connecting rod 59 has its upper end secured under the head of the screw 56 and its lower end hooked into a hole in the pawl lever 41 so that any movement of the solenoid armature 54 will effect movement of bracket 57 and rod 59 which will affect the pawl spring lever 41 so as to cause the springs 42 and 43 to exert pressure on the pawl 37 causing pawl 37 to pivot on pin 36 and thereby bring pawl projection 39 into engagement with its respective teeth on a valve gate ratchet stem 64. Upward movement of bracket 57 and rod 59 will raise spring lever 41 for actuating a closing movement of the valve gate 69 as an automatic step in an operative cycle of the unit when the coil 58 of the solenoid 51 is energized. Downward movement of bracket 57 and rod 59 will lower the spring lever 41 permitting the pawl 37 to pivot on pin 36 causing projection 38 to engage its respective teeth on the opposite side of the valve gate ratchet stem 64 when the coil 58 of the solenoid 51 is deenergized for actuating an opening movement of the valve gate 69 as another automatic step in the same operative cycle of the unit, an electric terminal block 60 is also mounted to the plate 50 by screws 61, and this plate 50 is mounted to the electric motor support by screws 62; a tube 63 for guiding the valve gate ratchet stem 64 has its upper end threaded into the cover 31 and secured by a lock nut 65 and its lower end threaded through a locknut 66 and into a packing nut 68 to secure a packing 67 and the upper end of the valve gate 69 is hooked into slots in the lower end of the valve gate ratchet stem 64 as shown at 70 in FIG. 3, the teeth on the valve gate stem 64 are positioned between toothless portions of the valve gate ratchet stem so as to limit the closing and opening of the valve gate 69 to definitely closed or definitely opened positions as shown in FIGS. 13 and 14; a spring c is secured to the cover 31 by a screw d (see FIGS. 3 and 8) for exerting additional friction pressure against movement of the valve gate and its ratchet stem 64 for limiting the movements of the valve gate 69 to those movements actuated by the projections 38 and 39 of the pawl 37 and this spring c together with the gate spring 75 and the packing 67 also maintains the valve gate 69 in its closed or open positions when the respective projection 38 or 39 is reciprocating in idleness against the toothless portions of the valve gate ratchet stem 64, as shown by 135 and 136, after said valve gate movements have been definitely closed or opened by the pawl and ratchet mechanism; a flap 71 is loosely hung to the valve gate 69 by a screw 72 so that drainage being discharged by the pump through the pump discharge opening 73, which opening is extended through the valve gate 69 as indicated by the dotted circle 74, will force the lower end of the flap 71 from the gate and permit the discharged drainage to pass freely through the opening 74 in the gate 69 but in the event of a power failure for a short period when drainage from the drainage disposal system will tend to create a reverse flow this flap will be forced against the gate 69 and prevent drainage from flowing backward through the pump discharge opening and returning to the drained area; a spring 75 secured at its upper end to the gate 69 exerts pressure by the gate against the partition 26 thereby insuring a closer fit between the gate and the partition when the gate is closed to block communication through the opening 27 in the partition 26; a second tube 76 has its upper end threadedly screwed through the cover 31 and secured by a lock cap 77 and this tube carries at its lower end a normally open miniature micro switch 78 having terminals 79 and 80 and an operating pin 81, this switch 78 is protected by a housing 82 that can be adjusted up or down on the tube 76 and locked in its adjusted position by a lock nut 83 and a flexible diaphragm 84 carrying a disc 85 is secured to the housing 82 by a pressure ring 86, the micro switch 78 is secured to the lower end of the tube 76 by a threaded block 87 and screws 88, and the rise of the level of drainage in the valve gate chamber 22 necessary to cause the diaphragm 84 to press the disc 85 against the operating pin 81 of the miniature micro switch 78 to close an electrical circuit through it can be predetermined by the said adjustment of the housing 82 up or down on the tube 76 and securing it in its adjusted position by tightening the lock nut 83; a sump pump lock lever 89 is pivoted to the pump housing 47 by a bolt 90 and a connecting rod 91 has its lower end hooked into a hole through the lever 89 and its upper end hooked through a hole in a nut 92 and this nut 92 is adjustable up or down by turning the head 93 of a screw 94, the screw 94 is journaled through the cover 31 and another nut 95 is rigid with the screw 94 and turns with it and this nut 95 is positioned on the screw 94 so as to allow the screw 94 to turn freely in the cover 31. By turning the head 93 of the screw 94 the outer end of the lever 89 (shown in FIG. 5) can be made to engage a vertical corner of the pump compartment 24 and force the pump 47 with considerable pressure against the walls already adjacent and in contact therewith in the opposite corner of said compartment 24 so that the discharge opening 73 of the pump 47 will correspond with a discharge opening in the partition 26 and also correspond with the discharge opening 74 through the valve gate, as shown in FIG. 6, and this locks the pump 47 in its operating position and prevents liquid leakage between the said walls in contact with each other. The pump 47 may also be unlocked from its operative position for removal from its compartment 24 when it is desired to separate the sub-units from each other in the event that service or repairs may be eventually required to the mechanism enclosed by the first sub-unit, by turning the head of the screw 94 in the opposite direction.

A gasket or packing 96 between the flanges 30 around the top of the valve gate chamber and around the top of the sump pump compartment and the cover 31 prevents the escape of gas or drainage from between the assembled first and second sub-units and a second cover 97 has lugs 98 secured to the cover 31 by two of a series of screws 99 and this second cover 97 is for protecting an electric motor 100 and all of the other mechanism located on the top side of the cover 31 and opposite sides of this second cover 97 is provided with wire mesh panels 141 for permitting the circulation of air for cooling said located mechanism.

As hereinbefore described and shown in FIGS. 13 and 14 of the drawing the teeth on the valve gate ratchet stem 64 are positioned so that pawl projection 39 will reciprocate in idleness against the toothless smooth portion 135 of the valve gate ratchet stem 64 as shown in FIG. 13 after the valve gate 69 has been moved by pawl projection 39 to its closed position and this arrangement of the teeth on the valve gate ratchet stem 64 provides for limiting the closing step of the valve gate 69 in an operative cycle to a definite closed position and also the teeth on the valve gate ratchet stem 64 are positioned so that pawl projection 38 will reciprocate in idleness against the toothless smooth portion 136 of the valve gate ratchet stem 64 as shown in FIG. 14 after the valve gate 69 has been moved by pawl projection 38 to its definite opened position and this arrangement of teeth on the valve gate ratchet stem 64 provides for limiting the opening step of the valve gate 69 in an operative cycle to a definitely opened position.

The electrical switches 53 and 78 are catalogued and manufactured by "Micro Switch" a division of Minneapolis-Honeywell Regulator Company of Freeport, Illinois, and the construction and operation of these switches are well known by those skilled in the art and also to those of the electrical fields; therefore the details of construction and operation of these micro switches are not described in this application.

By referring to FIG. 3, where the unit is shown as being maintained in idleness between operative cycles, the micro switch 53 is shown to be maintained in open circuit relation by the top end of the valve gate ratchet stem 64 which has during its final movement of the valve gate opening step of a preceding operative cycle engaged the operating pin 53a (see FIG. 10) of the micro switch 53 and forced this operating pin 53a into the switch body as shown in FIG. 3 thereby opening the normally closed motor electrical circuit through the switch 53 and terminating a pumping step of the preceding operative cycle of the unit and thereafter maintaining the unit in readiness for a succeeding operative cycle.

When the drainage rises in the valve gate chamber 22 to a level which has been predetermined by adjusting the switch housing 82 on the tube 76 the pressure then exerted by the drainage against the diaphragm 84 causes the disc 85 to force the operating pin 81 so as to close an electric circuit which energizes the coil 58 of the solenoid 51 so that the solenoid armature 54 is then attracted to lift its attached normally closed micro switch 53 upwardly and permit the switch to protrude its operating pin 53a (see FIG. 10) thereby closing an electrical circuit through the electric motor 100 and this initiates an automatic pumping step of a succeeding operative cycle of the unit.

Referring back to the sump pump 47 which is shown more in detail in FIGS. 3, 4, 5, 6 and 7, the shaft 101 of the electric motor 100 is connected to the upper end of the pump impeller shaft 102 by a coupling 103 and both these shafts 101 and 102 are secured to the coupling 103 by a key 104 and the impeller shaft 102 is further secured to the coupling 103 by a pin 105 so that a thrust plate 106 will carry the weight of the impeller shaft 102 and any item attached to it and the coupling 103 will prevent any downward movement of the impeller shaft and its attachments. The lower end of this impeller shaft 102 is journaled in a bearing 107 and has secured to it by a pin 108 an impeller 109 which carries an integral disintegrating pin 110 that extends directly through a pump intake opening 111 in a pump intake plate 112 and this plate 112 is secured to the pump impeller housing 113 by screws 114, of a series. Since this pin 110 is an integral part of the pump impeller 109 and rotates therewith solids in the drainage being pumped tending to enter the intake opening 111 are engaged by this rotating pin 110 and definintely disintegrated and thereby prevented from blocking the passage through the pump.

An opening or orifice 115 is extended through a portion of the pump impeller 109 from about the lower end of a bearing 107 to the outer rim of the impeller 109 so that drainage being pumped tending to pass between the rotating impeller shaft 102 and its bearing 107 will be collected by centrifugal attraction and discharged through the opening 115 by centrifugal force and thereby prevented from entering the pump support tube 46. The outer rim of the pump coupling 103 is threaded to mesh with teeth 116 of the worm gear 35 thereby providing a speed reduction mechanism for driving the pawl and ratchet mechanism for actuating the valve gate by the pump mechanism and also providing for operating the pump and the valve gate by the same source of power.

In FIG. 9, 137 is an oil reservoir containing a wick 138 for lubricating the worm gear 35 and a pin 139 is for securing the wick 138 in the reservoir.

The dotted line 21a in FIG. 1 indicates about the floor line when the unit is installed in a basement with a drainage pipe line connected through the unit as hereinbefore described.

Referring to the electrical wiring diagram in FIG. 19, the solid lines indicate the wiring connections and the positions of certain components when the unit is idle between operative cycles and with all electrical circuits being maintained in open circuit relation by the adjusted micro switch housing 82 preventing the diaphragm 84 from closing the micro switch 78 until drainage in the valve gate chamber has risen a predetermined heighth above its normal level and also by the top of the valve gate ratchet stem 64 engaging the operating pin 53a of the micro switch 53 and preventing the switch 53 from closing itself as hereinbefore described.

When drainage in the valve gate chamber 22 rises above a predetermined level, attained by screwing the diaphragm switch housing 82 up or down on the tube 76 and locking the housing in its adjusted position by tightening the locknut 83, the pressure by the drainage against the diaphragm 84 will then move the disc 85 so as to press the operating pin 81 and cause it to close the normally open micro switch 78 between terminals 79 and 80 and then the following electrical circuit will have been completed:

Prong H of a power supply plug 117, conductor 118, terminal 119, conductor 120, terminal 121, solenoid coil 58, terminal 122, conductor 123, terminal 80, dotted switch blade 78, terminal 79 and conductor 124 to ground. Since the closing of the above circuit energizes the solenoid coil 58 the solenoid armature 54 is attracted so as to move upward and carry with it the normally closed micro switch 53 thereby releasing the switch operating pin 53a from its engagement by the top of the gate valve ratchet stem 64 thereby permitting the switch 53 to normally close the following circuit:

Prong H of the power supply plug 117, conductor 118, terminal 119, conductor 125, terminal 126, electric motor 100, terminal 127, conductor 128, terminal 129, conductor 130, terminal 131, switch blade 53b, terminal 140, conductor 132, terminal 133, conductor 134 and ground prong G of the power supply plug 117. Since the closing of the above electrical circuit energizes the electric motor 100 and an automatic operative cycle of the unit takes place which includes the following steps:

Rotating electric motor 100, through the coupling 103 and impeller shaft 102, actuates the pump impeller 109 to pump drainage and at the same time actuates pin 110 to disintegrate solids in drainage being pumped and drainage being discharged by the pump into the valve gate chamber 22 opens flap 71 thereby opening the pump discharge passageway through the closed valve gate 69; simultaneously motor coupling 103 actuates worm gear 35 and its shaft 34 so as to reciprocate pawl projection 39 so that this projection 39 will engage teeth on its respective side of the valve gate ratchet stem 64 and move the valve gate 69 to its closed position and after this gate has reached its definite closed position pawl projection then reciprocates in idleness against a smooth toothless portion 135 of said valve gate stem 64 while the pump continues to force drainage from the pump compartment 24 into the valve gate chamber 22 and thence into the drainage disposal system.

After drainage in valve gate chamber 22 recedes below the predetermined level the pressure by the drainage on the diaphragm 84 drops and permits the switch 78 to normally open the electrical circuit through the solenoid coil 58 thereby deenergizing the solenoid and permitting the armature 54 and its attached micro switch to drop and thereby reverse the pawl 37 so that pawl projection 38 will engage teeth on its respective side of the valve gate ratchet stem 64 and move the gate 69 toward opened position but the micro switch 53 remains normally closed until the top of the valve gate ratchet stem 64, in its final opening movement, engages the operating pin 53a of the micro switch 53 and opens the electrical motor circuit, the pawl projection 38 then continues to reciprocate in idleness against the toothless smooth portion 136 of the valve gate ratchet stem 64 until the momentum of the electric motor recedes to a stop.

I claim:

1. A valve drive system associated with a pipe, which includes: a valve gate chamber, a sump compartment, valve means; pawl and ratchet means for positively closing and opening said valve means, a valve stem attached to said valve means and extending vertically upward therefrom, a by-pass passageway embodied within said valve means communicating with opposite sides of said valve means; pump means for forcing material through said by-pass passageway; motor means connected to said pump means, the teeth on said ratchet means being constructed and terminated on the valve stem extending upwardly from the said valve means limiting the movement of said valve means when it reaches the open or closed position thereof.

2. A valve drive system associated with a pipe, which includes: a valve means; mechanism for positively closing and opening said valve means, a by-pass passageway embodied within said valve means and communicating with opposite sides of said valve means; pump impeller means for forcing material directly through said passageway and motor means for actuating both said mechanism and said impeller means; said impeller means having a top hub portion, a vertical bore in said hub portion extending downwardly from the upper surface thereof, said bore having its upper end forming an entrance in proximity of the central area of the impeller chamber enclosing said impeller, a horizontal channel in said impeller arranged between the upper and lower surfaces thereof and extending from the lower end of said bore to the exterior of said impeller, the upper end of said bore being the proximal end of said bore and the outer end of said channel being the distal end of said channel, whereby the distal end of said channel is open to the annular area about said impeller and the proximal end of said bore is in communication with the central area of said impeller chamber surrounding said hub allowing entrapped matter about said hub to escape through said bore and said channel into the annular area about said impeller due to centrifugal force associated therewith while the impeller is in motion.

3. A valve drive system associated with a drain pipe, which includes: a valve gate chamber, a sump compartment, a valve gate means, mechanism for positively closing and opening said valve gate means, a by-pass passageway within the said valve gate means and extending therethrough and communicating with opposite sides thereof, the inlet end of said by-pass passageway being the proximal end of said by-pass passageway, the outlet end of said by-pass passageway being the distal end of said by-pass passageway, said proximal end being in communication with the sump pump chamber, said distal end being in communication with the valve chamber, pump means for forcing material through said by-pass passageway when said gate means is in closed position, hinged flap means mounted upon said valve gate means adapted to close the distal end of said by-pass passageway when said flap means is hanging in substantially vertical position, whereby a reverse flow of material is prevented from traveling through said by-pass passageway, and motor means connected to said pump means and by speed reducing means to said mechanism effecting operation of said valve gate means.

References Cited in the file of this patent

UNITED STATES PATENTS

| 426,954 | Parsons | Apr. 29, 1890 |
|---|---|---|
| 838,327 | Heitz | Dec. 11, 1906 |
| 1,178,193 | Trimbey | Apr. 4, 1916 |
| 1,575,008 | Rubin | Mar. 2, 1928 |
| 1,786,878 | Van Keuren | Dec. 30, 1930 |
| 2,347,544 | De Costa et al. | Apr. 25, 1944 |
| 2,431,640 | Gordon | Nov. 25, 1947 |
| 2,549,204 | Kaddatz | Apr. 17, 1951 |
| 2,809,591 | Imset | Oct. 15, 1957 |
| 2,980,127 | Workman | Apr. 18, 1961 |

FOREIGN PATENTS

| 212,713 | Austria | Jan. 10, 1961 |